(12) United States Patent
Katsuno et al.

(10) Patent No.: US 6,965,884 B2
(45) Date of Patent: Nov. 15, 2005

(54) SYSTEM AND METHOD FOR TRANSMITTING DATA BETWEEN TERMINALS BASED UPON PROGRESS VECTORS

(75) Inventors: Yasuharu Katsuno, Chigasaki (JP); Ryoji Honda, Saitama-ken (JP)

(73) Assignee: International Business Machines Corporation, Armonk, NY (US)

( * ) Notice: Subject to any disclaimer, the term of this patent is extended or adjusted under 35 U.S.C. 154(b) by 659 days.

(21) Appl. No.: 09/866,352

(22) Filed: May 25, 2001

(65) Prior Publication Data

US 2002/0035554 A1 Mar. 21, 2002

(30) Foreign Application Priority Data

May 25, 2000 (JP) ........................................ 2000-155350

(51) Int. Cl.[7] .................................................. G06E 1/00
(52) U.S. Cl. ....................................................... 706/17
(58) Field of Search .............................. 706/17, 62, 45, 706/48; 455/422.1, 509, 456.1, 457, 63.1; 340/995.1; 385/31; 342/378, 418, 361, 362, 373, 357; 370/222, 261

(56) References Cited

U.S. PATENT DOCUMENTS

| | | | | |
|---|---|---|---|---|
| 4,809,005 | A | * | 2/1989 | Counselman, III .......... 342/352 |
| 5,920,284 | A | * | 7/1999 | Victor .................... 342/357.01 |
| 5,936,570 | A | * | 8/1999 | Ghazvinian et al. ........ 342/354 |
| 5,943,606 | A | * | 8/1999 | Kremm et al. ............. 455/12.1 |
| 6,078,284 | A | * | 6/2000 | Levanon ................ 342/357.16 |
| 6,107,959 | A | * | 8/2000 | Levanon ................ 342/357.01 |
| 6,127,967 | A | * | 10/2000 | Ghazvinian et al. ........ 342/354 |
| 6,178,377 | B1 | * | 1/2001 | Ishihara et al. ............. 701/200 |
| 6,188,351 | B1 | * | 2/2001 | Bloebaum .............. 342/357.15 |
| 6,188,720 | B1 | * | 2/2001 | Batzer et al. ................ 375/222 |
| 6,327,534 | B1 | * | 12/2001 | Levanon et al. ............ 701/215 |
| 6,529,143 | B2 | * | 3/2003 | Mikkola et al. .......... 340/995.1 |
| 6,618,594 | B1 | * | 9/2003 | Myers et al. ................ 455/457 |
| 6,694,142 | B1 | * | 2/2004 | Kuwahara et al. ....... 455/456.1 |
| 6,697,633 | B1 | * | 2/2004 | Dogan et al. ............... 455/509 |

OTHER PUBLICATIONS

Willassen, "Positioning a Mobile Station", Dec. 1998, Retrieved from the Internet: http://www.willassen.no/msl/node6.htm.*

Bahl et al., "RADAR: An In–Building RF–Based User Location and Tracking System", INFOCOM, 2000.*

Birchler, "E911 Phase 2 Location Solution Landscape", FCC Location Round Table, Jun. 1999.*

Bahl et al., "User Location and Tracking in an In–Building Radio Network", Technical Report MSR–TR–99–12, Microsoft Corporation, Feb. 1999.*

(Continued)

*Primary Examiner*—Anthony Knight
*Assistant Examiner*—Michael B. Holmes
(74) *Attorney, Agent, or Firm*—Douglas W. Cameron, Esq.; McGinn & Gibb, PLLC

(57) ABSTRACT

By employing easy determination logic, the amount of communication required for broadcasting and relaying is effectively reduced, and the message transmission efficiency is improved. A mobile terminal T2 includes determination logic. According to this logic, when a message is issued, via an arbitrary terminal, by a transmission source terminal T0 to a relay terminal T1, and the message is relayed by the relay terminal T1 to the terminal T2, the terminal T2 calculates an information progress vector I, which indicates the direction in which information progresses, and a terminal progress vector M, which indicates the direction in which the terminal T2 progresses. Then, the terminal T2 obtains an inner product cos θ for which the information progress vector I and the terminal progress vector M are standardized, and forwards the received message when the condition cos θ≧0 is established.

24 Claims, 11 Drawing Sheets

OTHER PUBLICATIONS

Imeilinski et al., "GPS–Based Geographic Addressing, Routing and Resource Discovery", Communications of the ACM, Apr. 1999, vol. 42, No. 4.*

Ramanathan et al., "A Survey of Routing Techniques for Mobile Communications Networks", Mobile Networks and Applications 1996.*

Katsuno et al., "Magical Device: A Small Device That Makes It Easy to Build Real–World Navigation Systems", 2000 IEEE International Conference on Systems, Man and Cybernetics, Oct. 2000, vol. 2, pp. 914–919.*

Saltenis et al., "Indexing the Positions of Continuously Moving Objects", Proceedings of the 2000 ACM SIGMOD International Conference on the Management of Data, 2000.*

* cited by examiner

SYSTEM AND METHOD FOR TRANSMITTING DATA BETWEEN TERMINALS BASED UPON PROGRESS VECTORS

BACKGROUND OF THE INVENTION

1. Field of the Invention

The present invention relates to an information transmission system and an information transmission method for transmitting information through multiple terminals, and in particular to a technique for reducing the load imposed on information transmission traffic.

2. Related Art

Recently, a large variety of electronic apparatuses and electric facilities have been developed and are in practical use, and these apparatuses appear intelligent because of the development of microcomputer techniques. Further, as network techniques have been advanced, attempts have been made to provide a convenient employment form whereby these intelligent apparatuses can be interconnected, and exchange information and communicate with each other.

The "Bluetooth standards" and IEEE 802.11B have been advocated as communication standards for interconnecting these apparatuses. The Bluetooth standards are radio communication standards that use a radio frequency of 2.4 GHz, and one of the techniques used for the transmission of messages to fixed terminals or mobile terminals. According to the Bluetooth standards, a source terminal can broadcast messages to other terminals that are present within communication range, so that the messages can be received by many, unspecified terminals. The communication range of a terminal (i.e., the range within which a radio wave can received) is about 10 m at Class C.

Since no broadcast transmission destinations are specified, unnecessary transmissions may be broadcast and relayed. Such unnecessary transmissions result in an increase in the overall amount of communications within the system, and the deterioration of the efficiency of message transmission. Thus, the following methods can be employed to reduce the transfer of unnecessary messages and to improve the efficiency of message transmission.

A first method is one whereby limitations are placed on the relaying of messages. Provided in the header of a message is a portion for recording the relay count, and when the relay count exceeds a predetermined maximum count, the terminal that last receives the message does not retransmit it.

A second method is one whereby limitations are placed on message relay distances. Before a message is broadcast, included in the header of the message is positional information for the transmission source terminal, and a terminal that receives the message uses the positional information for the source terminal and for the local terminal to calculate a message transmission distance. Or, a portion for recording an accumulated transfer distance is provided in the header, and when the recorded distance exceeds a predetermined maximum relay distance, the terminal that last receives the message does not retransmit it.

A third method is one whereby limitations are placed on message relay periods. Before a message is broadcast, included in the header of the message is the transmission time at the source terminal, and a terminal that receives the message uses the transmission time and the current time to calculate a message relay period. When the message relay period exceeds a predetermined maximum relay period, the terminal that last receives the message does not retransmit it.

When, as in these methods, the transfer count, the transfer distance or the transfer period is limited, a phenomenon can be avoided whereby a message that has been adequately transmitted is forwarded endlessly.

A fourth method is one whereby space is provided in a message for terminal identifiers and for accumulating route information from each terminal that forwards the message. Since route information is stored at each terminal, the overlapping transfer of information can be prevented by referring to the route information.

A fifth method is one whereby a unique identifier is provided for each message and for the storage of a history of the information that is transmitted to each terminal. Since each terminal stores history information, when a message is received that has the same identifier as a previous one, a terminal, by referring to the history information, can ascertain that the message is not to be forwarded. As a result, the overlapping transfer of information can be avoided.

A sixth method is one whereby a multicast algorithm (routing algorithm) is introduced to each terminal. When the multicast algorithm is defined in advance before being stored in each terminal, the terminal can employ the algorithm to determine whether a message should be forwarded. Thus, the overlapping transfer of information can be avoided. This method is described in detail in "Distance Vector Multicast Routing Protocol", D. Waitzman, et. al, IETFRFC 1075, November 1988, or in "Core Based Tree (CBT)", T. Ballardie, et. al., ACM SIGCOMM93, pp. 85–95, 1993.

A seventh method is one whereby whether information should be forwarded is determined by referring to density information for a terminal, a progress vector from a source terminal to a relay terminal and a progress vector from the source terminal to an addressed terminal. When the density information for a terminal, the progress vector from a source terminal to a relay terminal and the progress vector from the source terminal to an addressed terminal are referred to, the information can be radially forwarded from the source terminal, and a transfer that is the reverse of the intended information progression can be prevented. Since a transfer in the direction that is the reverse of the information progression direction is generally an unnecessary transfer, such an unnecessary transfer can be prevented by inhibiting reverse transmissions.

However, the following problems are encountered when the above methods are employed to reduce the volume of unnecessary communications.

According to the first, the second and the third methods, it is difficult to determine an appropriate maximum relay count, an appropriate maximum relay distance and an appropriate maximum relay period, and when the maximum count, distance or period is too small, a message may not be transmitted. Assume that, since a broadcast and a relay system itself may not be established if the message transmission is disabled, a satisfactorily large maximum is set in order to acquire a message transmission function. In this case, the transfer efficiency can not be improved, and the objective can not be achieved.

According to the fourth method, a unique identifier must be provided for a terminal. This method can be applied for a closed system; however, for an open system, a globally unique identifier must be provided. For example, an identifier such as an IP (Internet Protocol) identifier is required, and a great load is imposed on maintenance and management.

According to the fifth method, history data for an identifier unique to a message should be held by each terminal, and as many history data as possible must be stored in order to improve transmission efficiency using this method. However, it is preferable that a terminal dedicated for broadcasting and relaying have as low a cost as possible and carry only a small load when performing information processing and information recording (according to the Bluetooth standards, it is assumed that these terminal functions will be carried out by a one-chip semiconductor device). Therefore, it is not preferable that a terminal having such a small load hold many history data. Further, as well as the determination of maximum values for the first to the third methods, it is difficult to determine an appropriate amount of history data to be stored. In addition, it is predicted that when there has been an enormous increase in the amount of communication, accordingly, the history data that will have to be stored will suffer a like increase. Therefore, when taking into account the processing form that will be required to cope with a huge increase in the amount of communication, it is apparent that the employment of this method is not advisable.

According to the sixth method, the establishment of a network topology is premised. So long as the network topology is established, unnecessary transfers can be effectively restricted by using this method. However, if the network topology is not established or is changed dynamically, this method can not be employed. For mobile communications, for example, dynamic network topology changes occur regularly. When the power supplied to a terminal is cut off, or when a terminal is powered on and connected to a network, the network topology at that time is not established.

Since according to the seventh method the premise is that there will be a fixed terminal, this method may not be satisfactory for a mobile terminal. Further, since a further premise is that density information will be acquired, the costs involved in calculating the density are high. If this method is employed on the assumption that a fixed terminal will be used, although the calculation of the density must only be performed once when the network is changed, if the method is applied for a mobile terminal, it is assumed that the terminal density is constantly changing, and the terminal density must be calculated in real time. In this case, the processing load imposed on each terminal to obtain the density information can not be ignored, and to measure the terminal density the communication load must be increased.

SUMMARY OF THE INVENTION

It is one object of the present invention to provide a technique whereby, according to easy determination logic, the volume of the communication required for broadcasting and relaying can be effectively reduced, and whereby message transmission efficiency can be improved.

It is another object of the present invention to provide a technique whereby inexpensive terminals and an inexpensive communication system can be employed to effectively reduce the volume of the communications required for broadcasting and relaying, and to enhance the message transmission efficiency.

It is an additional object of the present invention to provide a technique whereby the above described effects can be obtained by a message transmission system, constituted by mobile terminals, for broadcasting and relaying messages.

As an overview of the present invention, an information transmission method comprises the steps of: calculating an information progress vector (or a unit vector) that represents the progress of information; calculating a terminal progress vector (or a unit vector) that represents the travel performed by a terminal; calculating an angle θ formed by the information progress vector and the terminal progress vector or cos θ (or an angle θ between the unit vectors and or cos θ); determining that the cos θ is equal to or greater than a predetermined value; and transmitting no information when the decision is false. If the decision is true, information can be transmitted.

According to this information transmission method, the information progress vector and the terminal progress vector are obtained, and the information received from a terminal is forwarded only when the angle formed by these vectors is equal to or smaller than a predetermined angle, otherwise the information is not forwarded. As a result, a broadcasting and relaying system can be provided in accordance with an easy and clear determination reference. Therefore, transfers need not be limited by using a value, such as a message transfer count, a transfer distance or a transfer period, the determination reference of which is not always clear. Furthermore, an identifier need not be provided for a terminal or a message (information), and the history of the messages need not be stored. In addition, the determination reference for this invention can be employed regardless of whether the network topology is established, and the effects of the invention can also be obtained, regardless of whether the network topology is established. Therefore, the present invention provides great effects when the routing for an information transfer is disabled. Further, since for the present invention the premise is that a mobile terminal is being employed, the present invention can be effectively applied for a network constituted by mobile terminals.

The determination reference of the invention are as follows. Specifically, when the direction in which information progresses matches the direction in which the terminal progresses, transfer of the information is permitted, and when the direction in which information progresses is the reverse of the direction in which the terminal progresses, transfer of the information is not permitted. Thus, an information transfer is accelerated in the forward direction from the transmission source, and an information transfer is restricted in the reverse direction leading to the transmission source. As a result, broadcasting and relaying is ensured, unnecessary transfers can be prevented and transmission efficiency can be enhanced.

Of course, the conventional method can be employed with the configuration of this invention. Although the above described problems remain when the conventional method is employed by itself, when the conventional method is applied together with the present invention, the effects both of the prior art and the present invention can be obtained. Especially, when the first to the third, the sixth or the seventh method described in the background is employed with the invention, not only can the conventional defects be compensated for by the present invention, but also the desirable conventional effects can be obtained.

According to the method of the invention, the information progress vector (or a unit vector) can be calculated by the arbitrary use of two or more kinds of positional information selected from among positional information for the transmission source terminal, positional information for another terminal (excluding the transmission source) where information is relayed, and self-positional information. The terminal progress vector (or a unit vector) can be calculated by using current and past self-positional information. The positional information for the terminals can be included in information (a message) to be forwarded, and whether the message should be forwarded or not can be determined by using a minimum amount of information that does not increase the processing load imposed on the system or the terminal.

Positional information for a base station can be obtained by a terminal that is managed by the base station, and can be used as the self-positional information. Further, the positional information can be obtained by using a GPS.

A predetermined value of cos θ can be "0", for example. That is, a determination reference that a message can be forwarded so long as the angle formed by the information progress vector and the terminal progress vector falls the range from −90 to 90 degrees can be employed.

According to the method of the invention, density information for a terminal is obtained, and when the relationship s<|x−d| is established for a distance s between the terminal and an information transmission source terminal (a terminal that transmits information to one terminal), a communication limit distance x that is reached by a radio signal sent by the terminal, and an average inter-terminal distance d, the transmission of information is inhibited. When this determination reference is added, the efficiency of the information transmission can be improved. That is, when the relationship s<|x−d| is established, it means that the message transmission source terminal is located sufficiently near the terminal that receives the information (message). In other words, when the relationship s<|x−d| is satisfied, it is highly probable that there is another terminal that can receive a message from the same transmission source. At this time, the terminal near the transmission source does not transmit a message, and entrusts the transfer of the message to another terminal. Thus, an unnecessary message transfer can be prevented.

In order to acquire density information, the information transmission method further comprises the steps of: requesting the transmission of positional information by other terminals; receiving the positional information from the other terminals; and calculating an inter-terminal distance by using the self-positional information and the positional information for the other terminals, and calculating the average of the inter-terminal distances.

The information transmission method can be developed into an information transmission system or an information terminal that includes means for carrying out these processes (steps). And the information transmission system or the information terminal can perform the above described information transmission method.

DESCRIPTION OF THE PREFERRED EMBODIMENTS

Figure 1:
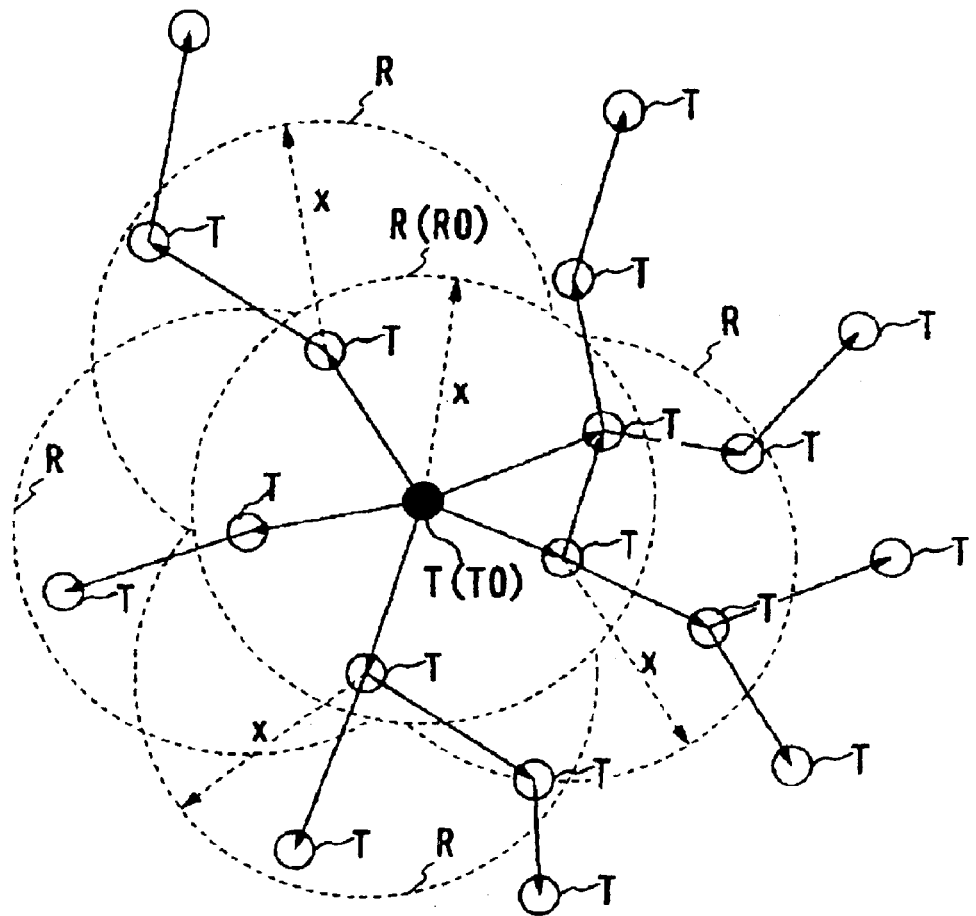
FIG. 1 is a diagram showing an overview of an information transmission system according to a first embodiment of the present invention.

The preferred embodiments of the present invention will now be described in detail while referring to the accompanying drawings. It should be noted, however, that the present invention can be implemented by using various different forms, and is not limited to these embodiments. The same reference numerals are used throughout to denote corresponding components.

In the following embodiment, mainly the method and the system will be described. As would be apparent to one having ordinary skill in the art, the present invention can be implemented not only as a system, but also as a recording medium for recording computer-readable program code. Therefore, the present invention can be provided as hardware or software, or as a combination of hardware and software. A medium for recording program code can be a computer-readable recording medium, such as a hard disk, a CD-ROM, an optical storage device, or a magneto-optical storage device.

First Embodiment

FIG. 1 is a diagram showing an overview of an information transmission system according to a first embodiment of the present invention. The information transmission system of this embodiment is constituted by multiple terminals T, and may be constituted by more terminals than are shown in FIG. 1. Further, the individual terminals may be controlled by a base station (not shown).

The terminal T includes radio communication means, as will be described later. In FIG. 1, a communication limit distance for the communication means is denoted by x, and a communication limit range R is indicated by a circle having a radius x (indicated by a broken line). In FIG. 1, for example, five other terminals T are present in a communication limit range R0 for a terminal T0. Assuming that the terminal T0 is a message transmission source, a message output by the source terminal T0 is received by the terminals T within the communication limit range R0. The terminals T include determination logic, which will be explained later, and this determination logic is used to determine whether the message should be forwarded. When the terminals T forward the received message in accordance with their determination logic, other terminals T present within the communication limit range R for the terminals T receive the message. Then, similarly, those terminals that received the message forward it sequentially. In this manner, a message issued by the transmission source terminal T0 is broadcast and relayed via the terminals T, and the distance the message is thus forwarded is extended.

Figure 2:
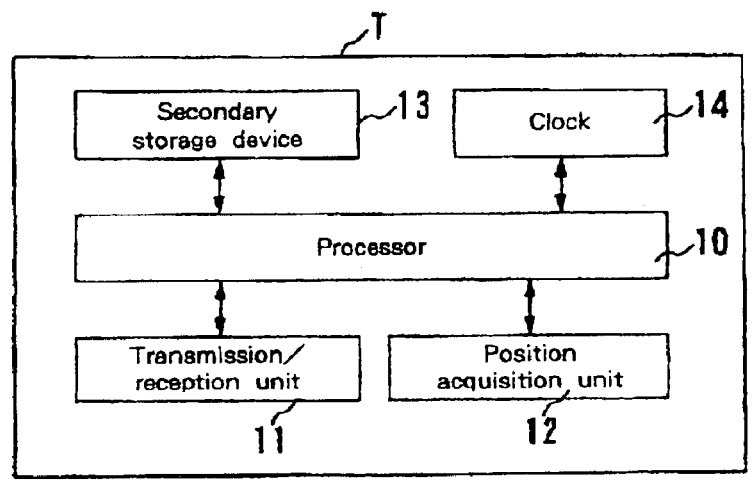
FIG. 2 is a block diagram showing an overview of a terminal configuration.

FIG. 2 is a block diagram showing an overview of the configuration of a terminal T. The terminal T comprises a processor 10, a transmission/reception unit 11, a position acquisition unit 12, a secondary storage device 13 and a clock 14. Although not shown, the terminal T can be mounted in various types of electronic apparatuses or electric apparatuses, and message (information) can be used by these apparatuses. The electronic apparatuses or the electric apparatuses are not limited to information processing apparatuses, such as a computers, and the terminal T can be mounted in a portable telephone, an automobile, a washing machine, a refrigerator or any other type of apparatus.

The processor 10 is, for example, a microprocessor. The processor 10 controls the other sections, such as the transmission/reception unit 11, the position acquisition unit 12, the secondary storage device 13 and the clock 14, and calculates an information progress vector and a terminal progress vector, which will be described later, and an inner product of the vectors. Further, the processor 10 determines whether a message should be forwarded, a process that will be described later.

The transmission/reception unit 11 performs radio communication with other terminals T. It is preferable that the transmission/reception unit 11 has no directivity and be a short-distance radio unit so that no communication fee is charged, and be, for example, a PHS (Personal Handy-phone System) or a Bluetooth device. For Bluetooth, a radio frequency of 2.4 GHz is employed and the information transfer speed is, for example, 1 Mpbs.

The position acquisition unit 12 obtains the current position of the terminal T. If the terminal T is controlled by a base station, positional information from the base station can be referred to in order to acquire the position. For example, the terminal T periodically or as needed inquires of the base station the positional information, and receives the positional information for the base station therefrom. While the location of the base station differs from that of the terminal T, the location of the base station is employed as the location of the terminal T because the terminal T is under the control of the base station. Thus, since a complicated mechanism for obtaining the positional information is not required for the terminal, an inexpensive and useable terminal T can be provided. An example terminal controlled by the base station can be a portable telephone or a PHS.

A GPS (Global Positioning System) can be employed as another position acquisition method. In this case, a mechanism for receiving wireless code from a broadcast satellite and for calculating the location must be prepared, but the advantage that is thereby made available is that the correct location can be obtained. However, as will be described later, even when the correct location can not be accurately obtained, satisfactory effects can be acquired.

A gyro may be employed for the positional information. In this case, the positional information can be received even at a place such as indoors where the wave from the GPS or the base station does not reach.

The secondary storage device 13 is a writable storage device, such as a semiconductor storage device. A nonvolatile semiconductor memory, such as a flash EEPROM (Electrical Erasable Programmable ROM), is preferable, but a memory such as a hard disk drive having a rotary mechanism, or a volatile memory such as DRAM (Dynamic Random Access Memory) may be employed. A message to be exchanged, the past self-positional information, and the positional information of a transmission source terminal or a relay source terminal are stored in the secondary storage device 13. Although not requisite for the invention, the history of messages or their identifiers, or the history of the identifiers provided for the terminals may be recorded.

The clock 14 is used for the current time. The clock 14 is used to obtain the current time to be compared with a time stamp attached to a received message, or the time information included in the message. This clock 14 is not a requisite component of this invention, and further, a mechanism for generating a terminal identifier may be included, although also not requisite.

Figure 3:
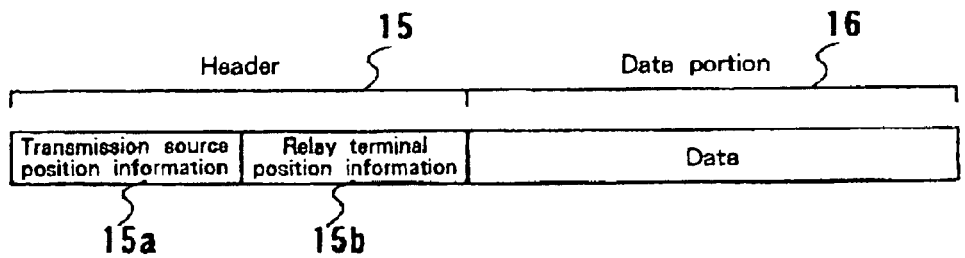
FIG. 3 is a diagram showing the data structure of a message that is exchanged by terminals.

FIG. 3 is a diagram showing he data structure of a message that is exchanged by the terminals T. The message is divided into a header 15 and a data portion 16. The header 15 includes transmission source positional information 15a and relay positional information 15b, and the data portion 16 includes the contents of a message.

The transmission source positional information 15a is positional information for the transmission source terminal T0 that first issued a message. The transmission source terminal T0 records the positional information in the transmission source positional information 15a obtained by the position acquisition unit 12, and outputs the message. The relay positional information 15b is the positional information for the terminal T that last issued the message. For the terminal T that receives the message, the relay positional information 15b indicates the position of the immediately preceding terminal that forwarded the message.

Although not requisite for the present invention, the header 15 may include other information, such as a message identifier (ID), a transmission source terminal ID, a relay terminal ID, a relay count and a maximum relay period (effective period). These data can also be employed when the present invention is jointly employed with the conventional method.

Figure 4:
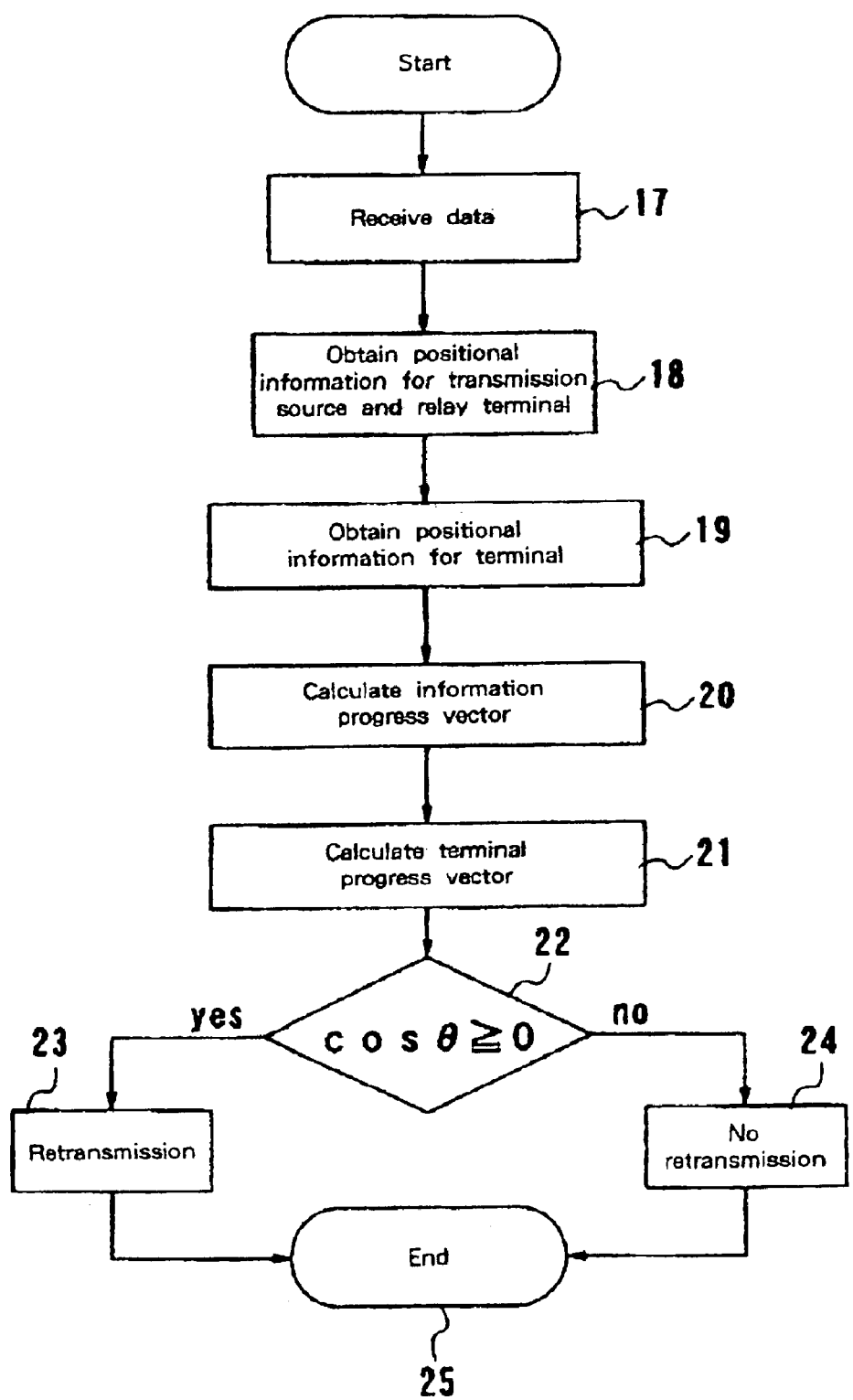
FIG. 4 is a flowchart showing an example information transmission method according to the first embodiment.
Figure 5:
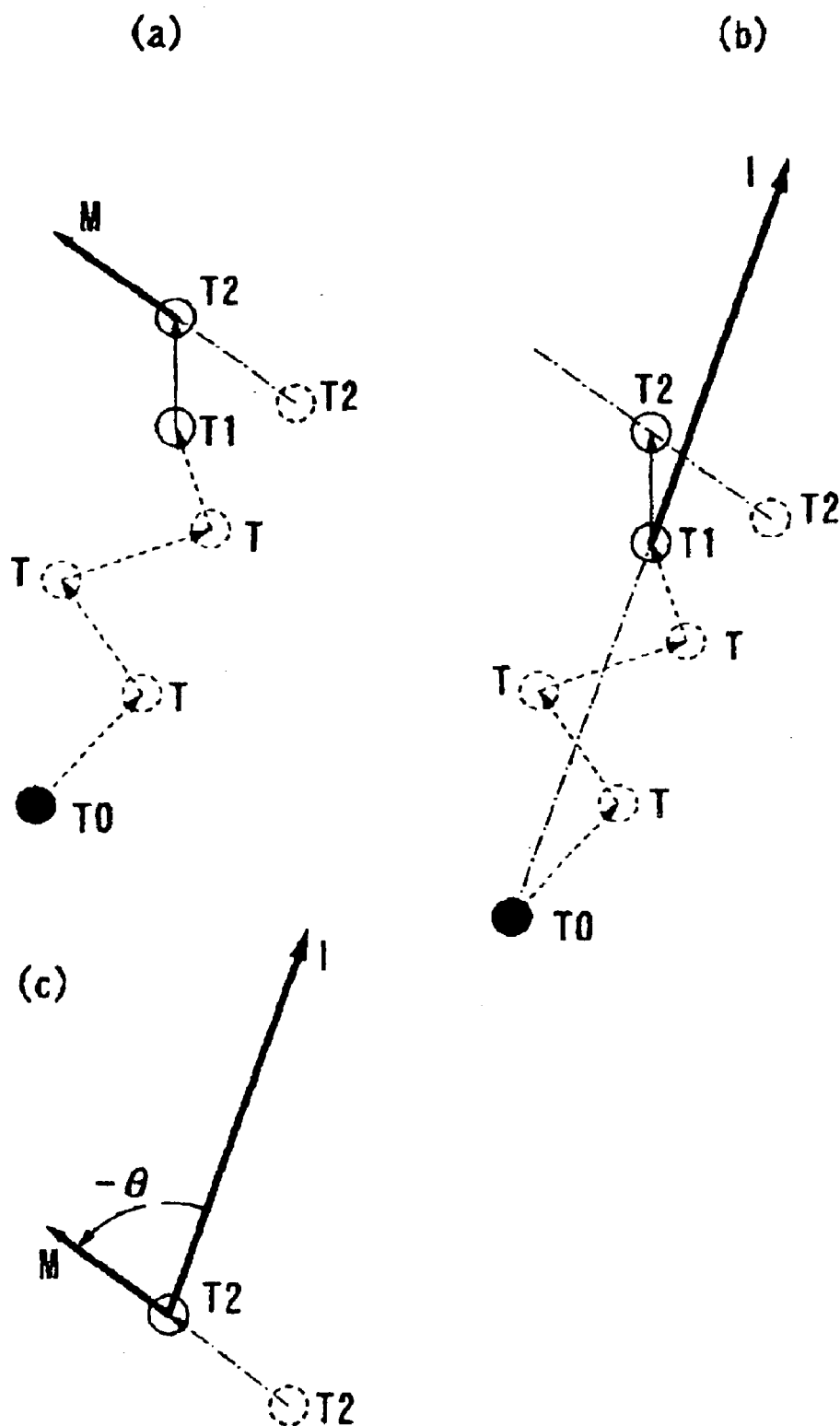
FIG. 5A is a diagram showing an example message transmission and an example progress of a terminal.
FIG. 5B is a diagram for explaining an information progress vector.
FIG. 5C is a diagram showing the relationship between an information progress vector and a terminal progress vector.

FIG. 4 is a flowchart showing an example information transmission method according to the embodiment of the invention, and FIG. 5A is a diagram showing an example message transmission (information) and an example progression of the terminal T.

Assume that, as is shown in FIG. 5A, a message broadcast by the transmission source terminal T0 is relayed, via several terminals T, to the relay terminal T1, and is then forwarded to the terminal T2, which is moving. The terminal T1 is a relay terminal for the message that is to be forwarded to the terminal T2, and the terminal T2 is the destination terminal. Suppose that the terminal T2 is traveling as is indicated by a vector M.

The information (message) is transmitted to the terminal T2 by the transmission/reception unit 11 of the terminal T1, and the message (data) is received by the transmission/reception unit 11 of the terminal T2 (step 17). The structure of the received message (data) is as shown in FIG. 3. The processor 10 handles the received message and temporarily stores it in the secondary storage device 13. In the processing performed thereafter, the message data stored in the secondary storage device 13 are examined; however, no explanation will be given for that process this time.

The processor 10 of the terminal T2 examines the message stored in the secondary storage device 13 to obtain the positional information 15a and 15b transmitted by the transmission source terminal T0 and the relay terminal T1 (step 18), and thereafter, the terminal T2 obtains the self-positional information by using the position acquisition unit 12 (step 19). As the position acquisition method, a well known technique may be employed when the terminal is controlled by the base station or when the GPS is used.

The terminal T1 calculates the information progress vector I and the terminal progress vector M (steps 20 and 21).

FIG. 5B is a diagram for explaining the information progress vector I. As is shown in FIG. 5B, the information progress vector I is defined as a difference vector between the position vector of the transmission source terminal T0 and the position vector of the relay terminal T1. Specifically, the direction in which the information (message) is progressing is represented as a vector for which the location of the transmission source terminal T0 is defined as the start point and the location of the relay terminal T1 is defined as the end point. As is shown in FIG. 5A, the terminal progress vector M is represented as a vector where the previous location of the terminal T2 is defined as the start point and the current location is defined as the end point. The positional information required for these calculations is obtained from a received message, or from prior positional information stored in the secondary storage device 13 of the terminal T2 and current position data obtained by the position acquisition unit 12.

As is shown in FIG. 5C, θ is defined as the angle formed by the information progress vector I and the terminal progress vector M, and a check is performed to determine whether the value of cos θ is equal to or greater than 0 (step 22). The value of cos θ is acquired by calculating the inner product I·M of the vectors, and by calculating cos θ=I·M/(|I|·|M|). When the value of cos θ is equal to or greater than 0, the terminal T2 retransmits the message (step 23). While when the value of cos θ is smaller than 0, the terminal T2 does not retransmit the message (step 24). The processing is thereafter terminated.

As is described above, the terminal T2 retransmits the received message when the value of cos θ is a positive value; this means that the terminal T2 does not retransmit the message when it is moving toward the information transmission source terminal T0, and that the terminal T2 retransmits the message when it is moving away from the transmission source terminal T0. In this embodiment, cos θ=0 is employed as a reference value for determination; however, a large, positive or negative value may be employed as a determination reference value. Assuming that the terminal T2 is traveling at random, when the reference value is shifted far to the negative side, the probability the message will be retransmitted is increased, while when the reference value is shifted far to the positive side, the probability the message will be retransmitted is reduced.

Figure 6:
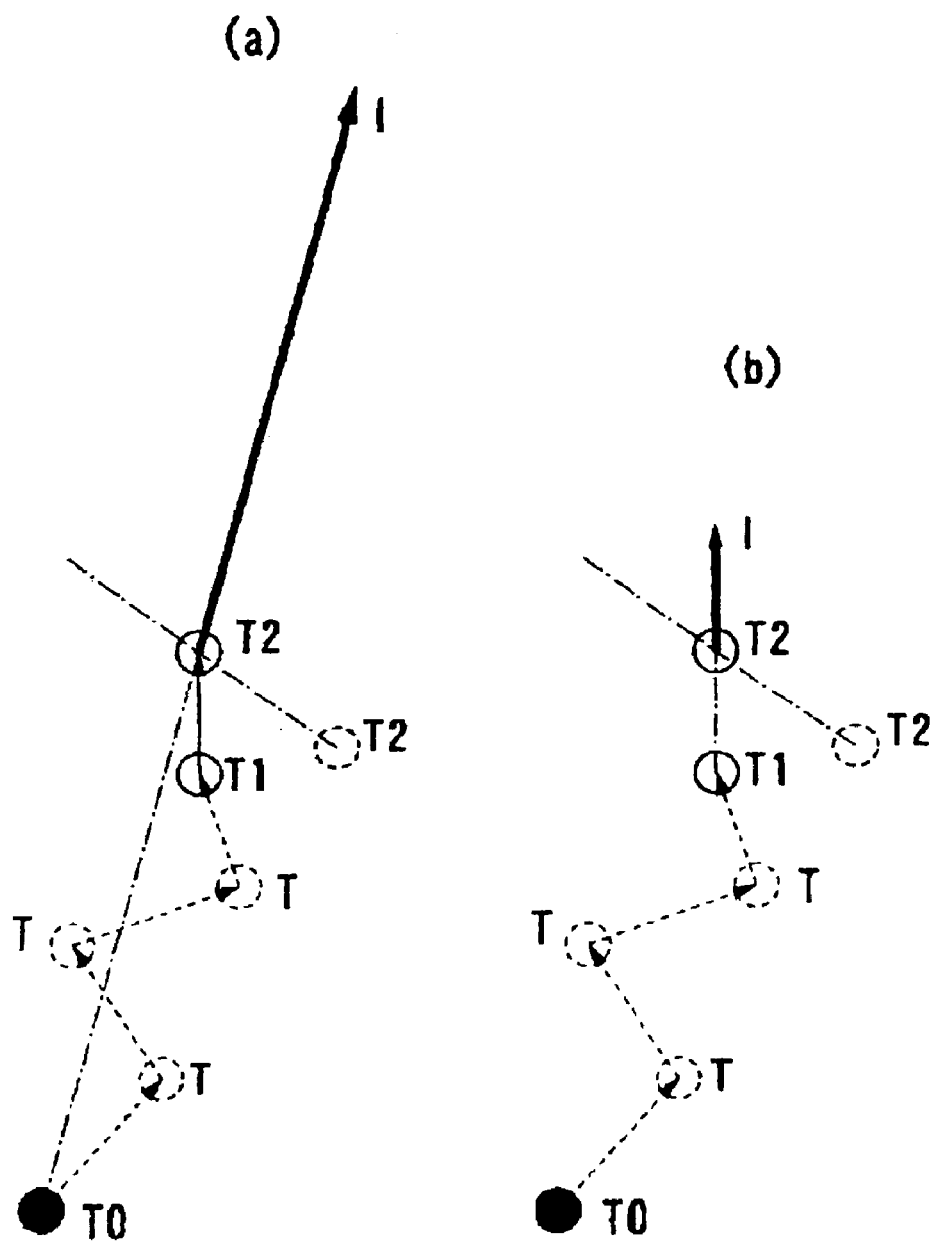
FIGS. 6A and 6b are diagrams showing other information progress vectors.

As is shown in FIG. 6A, the information progress vector I may be represented as a vector where the transmission source terminal T0 is defined as the start point and the target terminal T2 is defined as the end point. In this case, positional information for the relay terminal T1 is not necessary. Further, as is shown in FIG. 6B, the information progress vector I may be represented as a vector where the relay terminal T1 is defined as the start point and the target terminal T2 is defined as the end point. In this case, positional information for the transmission source terminal T0 is not necessary. While taking into account the precision of the information progress vector I, however, it is preferable that the start point be the location of the transmission source terminal T0. Further, the information progress vector I can be defined as a vector where the location of an arbitrary terminal by which the message (information) is relayed is defined as the start point or the end point.

As is described above, according to the information transmission method of the invention, an extremely simple determination reference can be employed to determine whether the terminal T2 that received the message should forward the message. Therefore, the maximum relay count, the maximum period and the maximum distance, appropriate values for which are difficult to determine, need not be employed as reference values. Furthermore, the only data to be referred to in this embodiment are the positional information for the transmission source terminal T0, the positional information for the relay terminal T1 and the previous and current positional information for the terminal T2. An enormous amount of history information need not be stored, and an identifier need not be provided for each terminal or message. That is, the message transmission traffic can be reduced because only a small amount of information is employed. Further, since the information referred to in this embodiment is the positional information for the transmission source terminal T0, the relay terminal T1 and the target terminal T2, the network topology need not be established. Thus, the embodiment can function effectively even under conditions wherein routing can not be performed.

Of course, the conventional determination logic may be employed with the determination logic in this embodiment. In this case, since it is expected that the message transfer traffic will be reduced in accordance with the determination logic of the present invention, the conventional determination logic can be employed by relaxing the transfer enabled condition.

Figure 7:
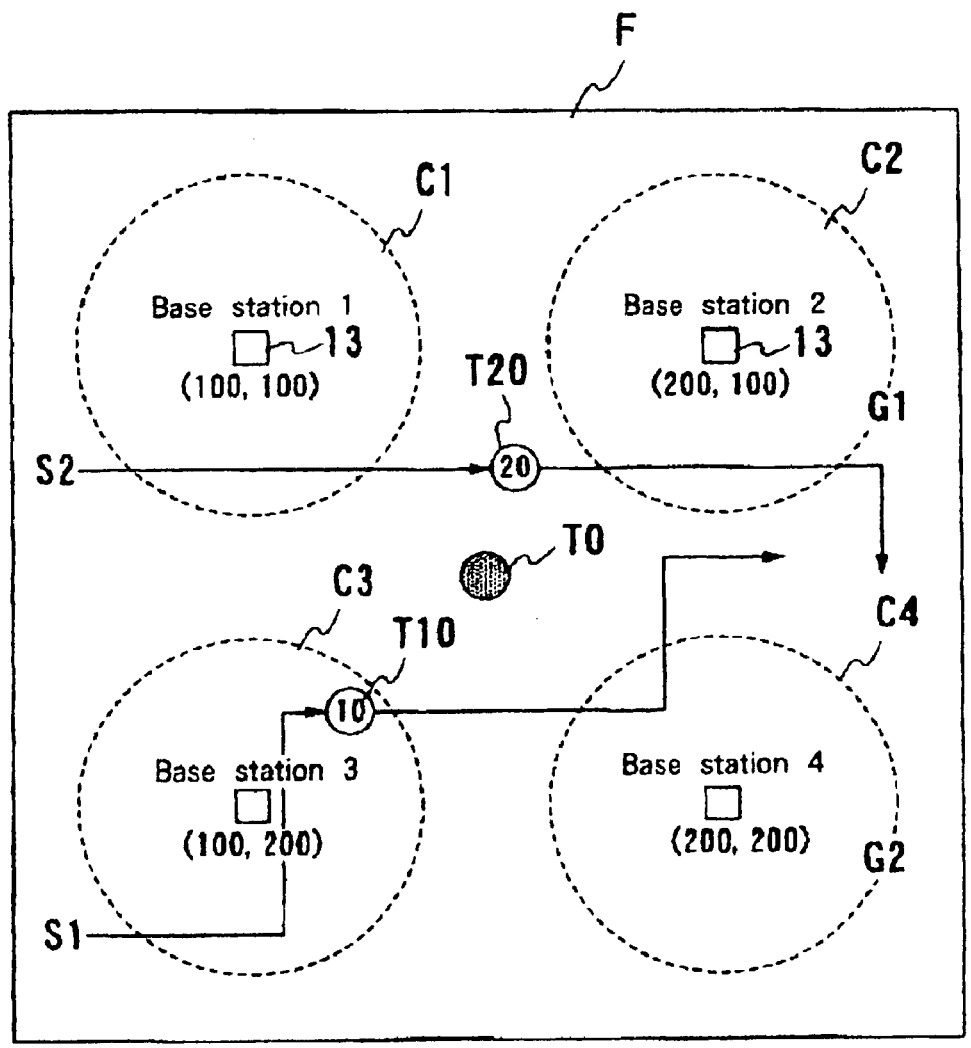
FIG. 7 is a diagram for explaining the condition for a simulation.

Next, an explanation will be given for the results obtained by examining through simulation the effects of the transmission method of this embodiment. FIG. 7 is a diagram for explaining the conditions for the simulation, for which the following is assumed.

As is shown in FIG. 7, a field F for the simulation is assumed to be a square, and within it four base stations B (base stations 1 to 4) are provided at constant intervals, at absolute positions for the respective base stations of (100, 100), (100, 200), (200, 100) and (200, 200). Assume now that the base stations B use radio communication to form cells C, and that the terminals located in the cells C can provide positional information for the base stations.

The transmission source terminal T0 is the only terminal that initially issues a message, which it transmits only once at the beginning of the simulation. For this simulation the transmission source terminal T0 is assumed to be fixed.

Other terminals T are present in the field F, and each of them moves from a start point S to a goal point G, which are determined at random for each terminal. Assume further that a terminal T moves in four directions, vertically and horizontally, and does not reverse its direction, that the distance a terminal T travels is determined at random, and that a terminal T stops when it reaches a goal point G. For example, a terminal T10 moves from the start point S1 up and to the right until it reaches the goal point G1.

Although a terminal T does not know its own current location, when the terminal T enters a cell C, it obtains an absolute position from the base station B that controls the pertinent cell C. The absolute position of the base station B is recorded as the relative position of the terminal T, and when the terminal T moves to another cell C, the latest positional information is acquired. For example, the current position of the terminal T10 is (100, 200) and the current position of the terminal T20 is (100, 100). Their relative positions are stored as histories in the terminals T. At the least, the current positional information and the immediately preceding positional information are stored as history information.

A terminal T receives a message, and retransmits the message after a predetermined time has elapsed. The message is broadcast to all terminals located within radio communication distance of the terminal T. The transmission of the message by the terminal T is performed only once after the message is received.

With the above described assumptions, the parameters for the simulation are set as follows.

| | |
|---|---|
| Length of one side of the field F: | 1000 m |
| Interval between base stations: | 100 m |
| The radius off a cell C: | 100 m |
| Communication limit range for a terminal: | 100 m |
| Time interval until message retransmission: | 10 seconds |
| Travel velocity of a terminal: | 1.0 m/s |
| The number of terminals (excluding transmission source): | 600 units |
| Simulation time: | 7000 seconds |

Figure 8:
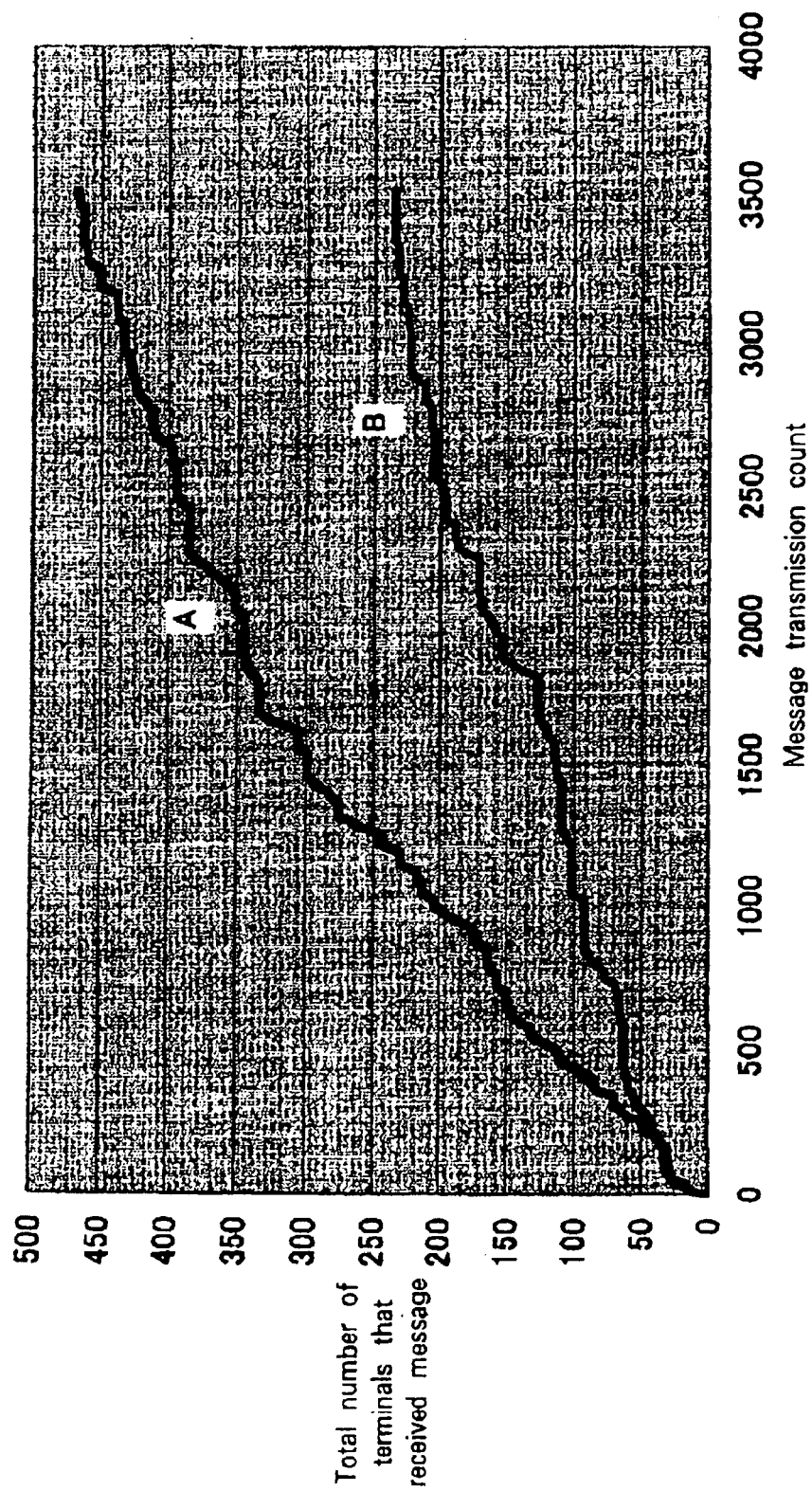
FIG. 8 is a graph showing the results obtained by simulating the information transmission method according to the first embodiment.

FIG. 8 is a graph showing the results of the simulation. The vertical axis represents the total number of terminals that received the message during the simulation, and the horizontal axis represents the number of times the message was transmitted. If the number of message transmissions is the same, the message transmission efficiency is higher when a large number of terminals received the message.

A curve A shows the results when the transmission method of the embodiment was employed. For comparison, a curve B shows the results obtained by a trivial method. The trivial method is a method whereby all the terminals that received a message retransmit the message. As is apparent from FIG. 8, in accordance with the method of this embodiment the transmission efficiency was almost doubled.

Second Embodiment

Figure 9:
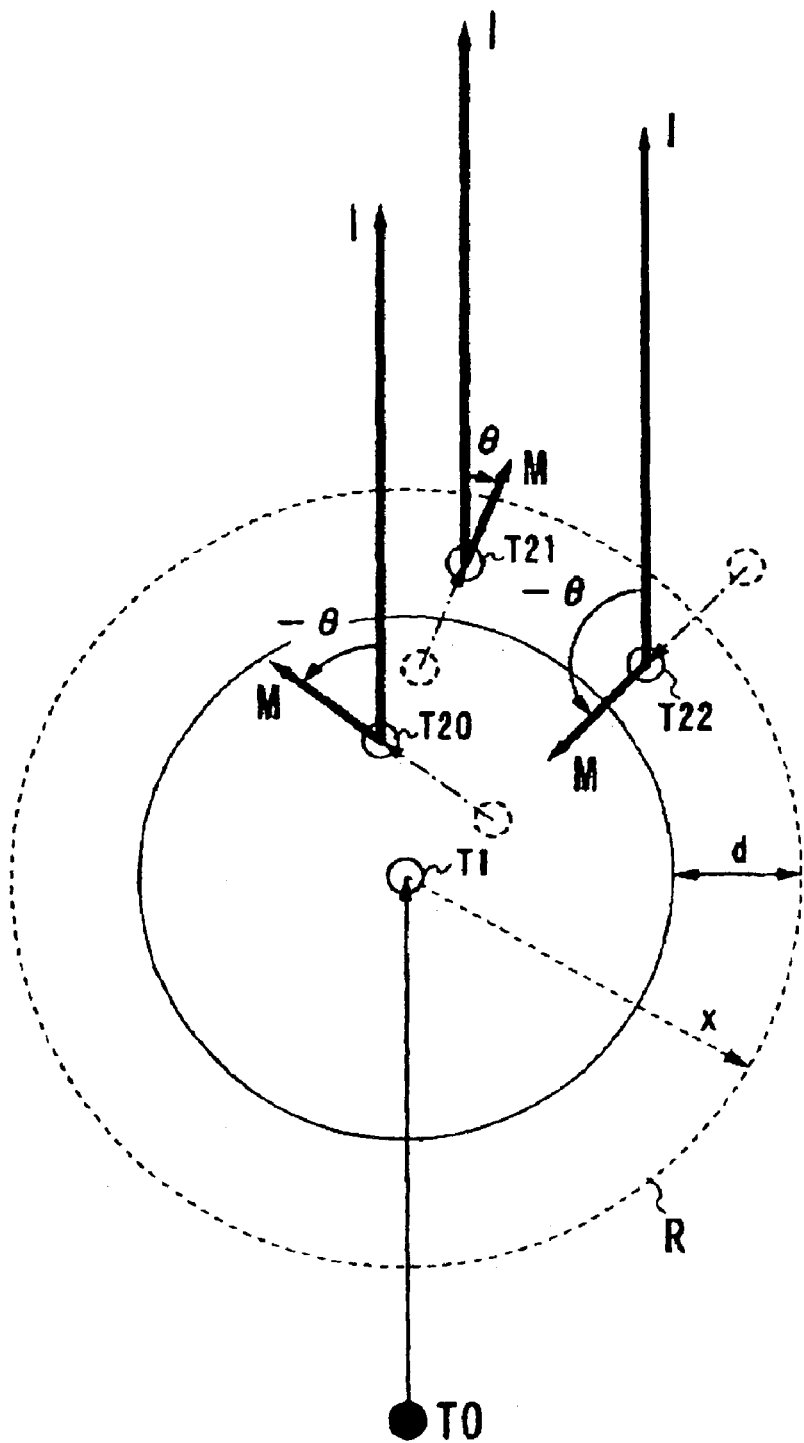
FIG. 9 is a diagram for explaining an information transmission method according to a second embodiment of the present invention.

FIG. 9 is a diagram for explaining an information transmission method according to a second embodiment of the present invention. Assume that a transmission source terminal T0 as was used for the first embodiment issues a message to a relay terminal T1, and that the relay terminal T1 then forwards the message to target terminals T20 to T22. The transmission limit distance for the relay terminal T1 is x, and the message is forwarded to the terminals T20 to T22 that are located within the broadcast distance represented by the radius x. The determination logic used to determine whether the terminals T20 to T22 should forward the message will now be described. In this embodiment, an explanation will be given for a method whereby the application of determination logic while taking terminal density into account is employed together with the determination logic in the first embodiment.

Figure 10:
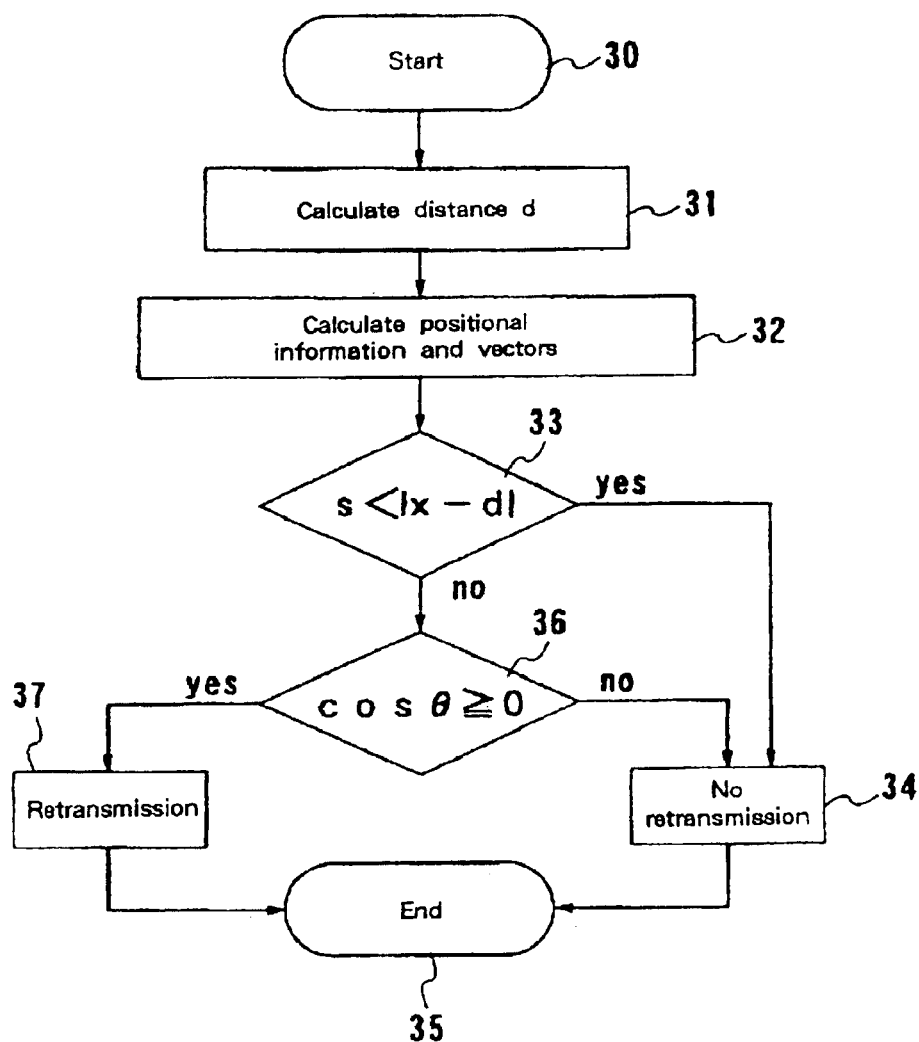
FIG. 10 is a flowchart showing an example transmission method for the second embodiment.

FIG. 10 is a flowchart showing an example information transmission method according to this embodiment. Upon the receipt of the message, each of the terminals T20 to T22 begins the processing (step 30), and calculates the average inter-terminal distance d (step 31). This calculation step may be performed before the receipt of the message.

Figure 11:
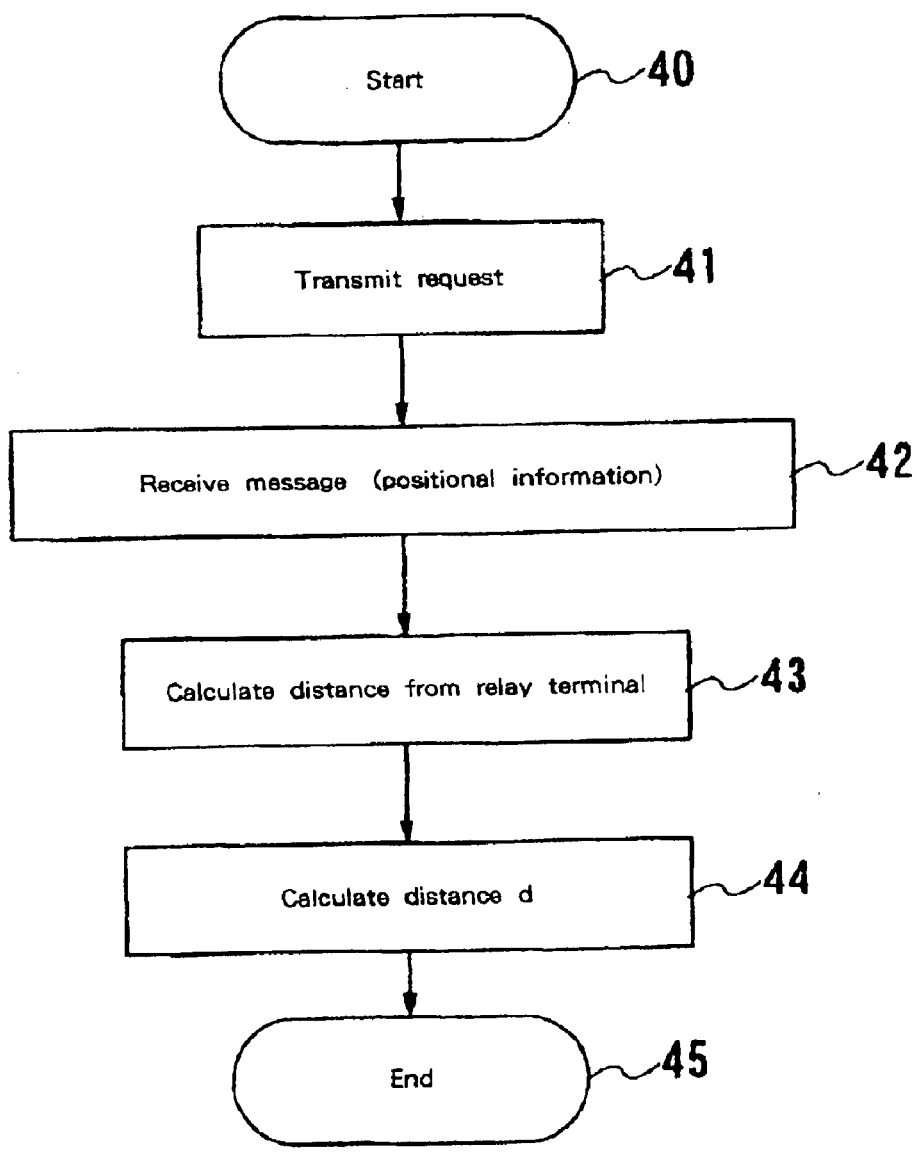
FIG. 11 is a flowchart showing an example step of calculating an average inter-terminal distance d.

FIG. 11 is a flowchart showing an example step in the calculation of the average inter-terminal distance d. First, a terminal that is to calculate the average inter-terminal distance d issues a positional information transmission request to the other terminals (step 41). This transmission request is transmitted to all the terminals that are located within the communication limit range of the subject terminal. Upon the receipt of this request, the other terminals each transmit to the terminal that issued the request a message that includes self-positional information (step 42). Then, the terminal that is to calculate the average inter-terminal distance d obtains its own positional information, and employs the positional information included in the received messages to calculate the distances to the respective terminals (step 43). Following this, the average of the obtained distances to the individual terminals is calculated to acquire the average inter-terminal distance d (step 44). The processing is thereafter terminated (step 45).

Next, as in the first embodiment, the terminal that has obtained the average inter-terminal distance d acquires the positional information for the transmission source terminal T0 and the relay terminal T1, and also the positional information for the local terminals T20 to T22, and calculates the information progress vector I and the terminal progress vector M (step 32).

Sequentially, each of the terminals T20 to T22 calculates the distance s from the relay terminal T1 by using its own positional information and the positional information of the relay terminal T1. A check is then performed to determine whether the condition s<|x−d| has been established for the distance s, the radio communication limit distance x and the average inter-terminal distance d (step 33). If the decision is true, it is decided to halt the retransmission of the message (step 34), and the processing is thereafter terminated (step 35). By referring to FIG. 9, when the condition s<|x−d| is established, it means that the terminal is present in an area R2 that is well inside the average inter-terminal distance d from the communication limit range R1 of the relay terminal T1. In FIG. 9, for example, the terminal T20 corresponds to a terminal that satisfies the above condition. This terminal is sufficiently near the relay terminal T1 that a message the terminal receives from the relay terminal Ti is probably also received by the other terminals (the terminals T21 and T22 in FIG. 9). Thus, the terminal T20 does not forward the message and entrusts the retransmission of the message to the other terminals, so that the message transmission traffic can be reduced without discontinuing the transmission of the message. In other words, it is probable that a message issued by a terminal (terminal T20) that satisfies the condition s<|x−d| will be unnecessary. Therefore, in this embodiment, the retransmission of the message is not performed by a terminal (terminal T20) that satisfies the condition s<|x−d|.

When, at step 33, the condition s<|x−d| is not established, whether or not the condition cos θ≧0 is established is examined as in the first embodiment (step 36). The condition cos θ≧0 may be appropriately relaxed as in the first embodiment. In accordance with the determination at step 36, the process for halting the retransmission of a message (step 34) or the process for retransmitting the message (step 37) is performed in the same manner as in the first embodiment. The processing is thereafter terminated (step 35). In FIG. 9, the terminals T21 and T22 perform the determination process at step 36. Since the terminal progress vector M at the terminal T22 is pointed in the direction opposite to that of the information progress vector I, the message is not retransmitted. And as a result, the terminal 21, which does not satisfy the condition s<|x−d| but does satisfy the condition cos θ≧0, retransmits the message.

Figure 12:
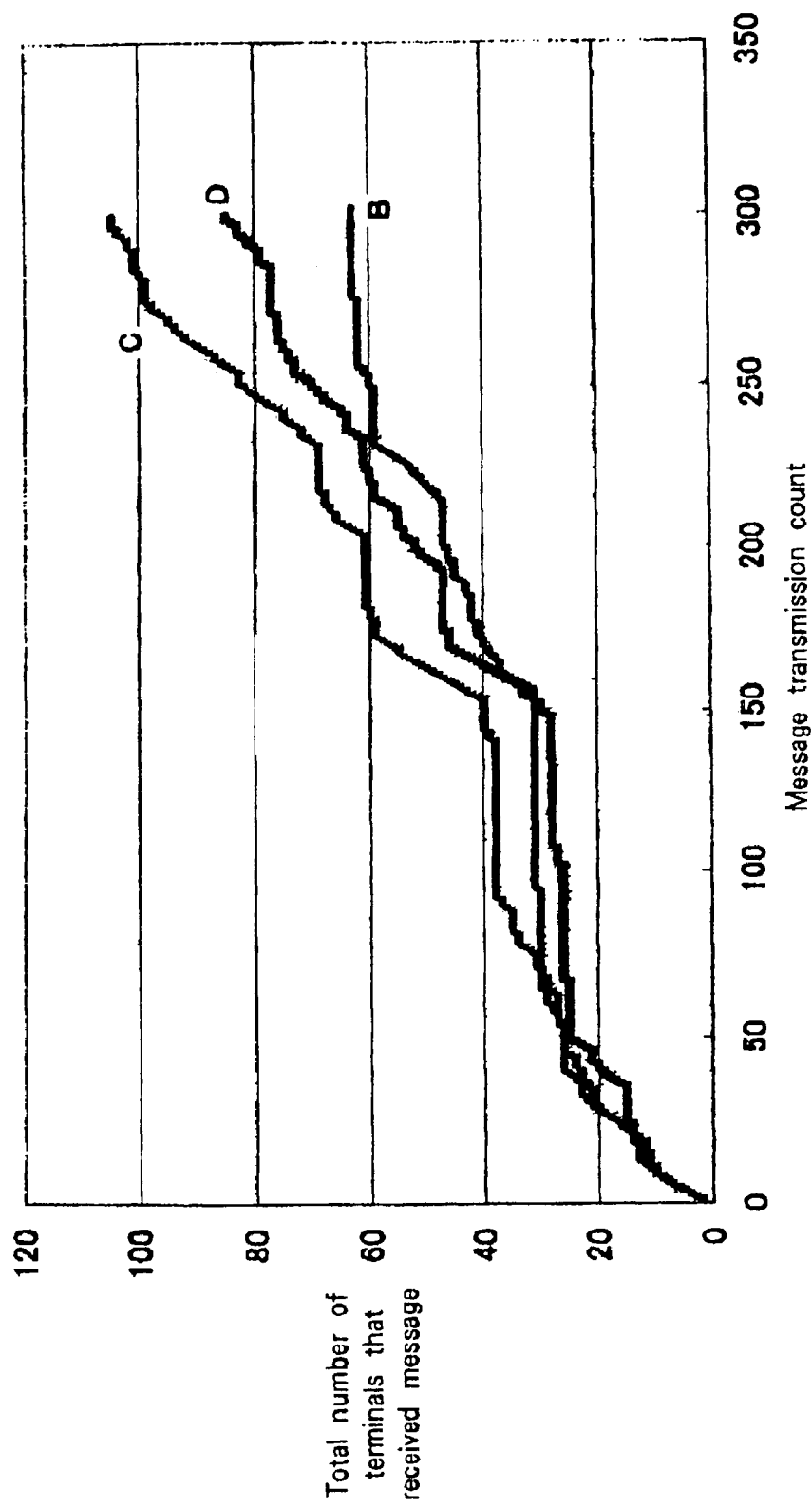
FIG. 12 is a graph showing the results obtained by simulating the information transmission method according to the second embodiment.

FIG. 12 is a graph showing the results obtained by simulating the transmission method of the second embodiment under the same conditions as in the first embodiment. The vertical axis represents the total number of terminals that received the message during the simulation period and the horizontal axis represents the number of transmissions of the message.

A curve C shows the results obtained when the transmission method of the second embodiment was employed. For comparison, a curve B shows the results obtained by the trivial method as in the first embodiment, and a curve D shows the results obtained when a determination using the information progress vector and the terminal progress vector of this invention is not made. As is apparent from FIG. 12, the method of this embodiment provides a greater improvement in transmission efficiency than do the other methods.

As is described above, the present invention has been specifically explained while referring to the embodiments; however, the present invention is not limited to these embodiments, and can be variously modified without departing from the scope of the subject of the invention.

A method, such as a GPS, may be employed by a terminal to obtain its own positional information. Further, the progress vector of a local terminal may be calculated not only based on the positional information, but also by using another method, such as one whereby a velocity sensor is used that employs an acceleration sensor and an integrator incorporated in the local terminal. In addition, for the calculation of the information progress vector, the unit vectors may be obtained and the inner product of the unit vectors may be calculated to obtain cos θ. Furthermore, not only the determination logic of the embodiments but also the conventional determination method may be employed; for example, the maximum relay count, the maximum relay period and the maximum relay distance may be defined in advance, and when these maximum values are exceeded, a message may not be forwarded. As another conventional method that may be employed, there in one whereby identifiers inherent to messages or identifiers inherent to terminals are provided and the history of the identifiers are stored in a file for reference.

According to the present invention, the specific effects that are obtained are as follows.

According to an easy determination logic, the volume of the communications required for broadcasting and relaying can be effectively reduced, and the message transmission efficiency can be improved. Furthermore, these benefits can be obtained while employing inexpensive terminals and an inexpensive communication system. In addition, for broadcasting and relaying, message transmission efficiency can also be improved for a message transmission system that is constituted by mobile terminals.

What is claimed is:

1. An information transmission method, whereby a message packet from a source terminal, said source terminal being one of multiple terminals, is relayed and forwarded by another terminal, said method comprising:

calculating an information progress vector that represents a progress of said message packet;

calculating a terminal progress vector that represents a travel performed by a specific terminal among said multiple terminals;

calculating a cosine (cos θ) of an angle θ formed by said information progress vector and said terminal progress vector;

determining whether said cos θ is equal to or greater than a predetermined value; and halting a transmission of said message packet from said specific terminal when a decision of said determining is false.

2. The information transmission method according to claim 1, further comprising:

transmitting said message packet from said specific terminal when the decision of said determining is true.

3. The information transmission method according to claim 1, wherein said information progress vector is calculated by an arbitrary use of two or more kinds of a positional information selected from among:

a positional information for said transmission source terminal included in said information, a positional information for other terminals, excluding said transmission source terminal, where information is delayed, and a positional information obtained by said specific terminal; and wherein said terminal progress vector is calculated by using current and past positional information obtained by said specific terminal.

4. The information transmission method according to claim 3, wherein said positional information is obtained by a first method whereby a positional information for a base station is obtained by a terminal that is controlled by said base station, said base station positional information used as said positional information of said terminal, or a second method for using a GPS (Global Positioning System).

5. The information transmission method according to claim 1, wherein said predetermined value is 0.

6. The information transmission method according to claim 1, wherein a density information for a terminal is obtained, and when a relationship s<|x−d| is established for a distance s between said specific terminal and a terminal that transmits information to said specific terminal, a communication limit distance x that is reached by a radio signal sent by said terminal, and an average inter-terminal distance d, the transmission of said message packet by said terminal is inhibited.

7. The information transmission method according to claim 6, further comprising:

requesting a transmission of a positional information by other terminals;

receiving said positional information from said other terminals; and calculating an inter-terminal distance by using said positional information of said specific terminal and said positional information for said other terminals, and calculating an average of said inter-terminal distances and obtaining said distance d.

8. An information transmission system, wherein multiple terminals, including means for obtaining a location and means for exchanging information by radio, are provided, and wherein one of said terminals receives a message packet from one of the remaining terminals and forwards said message packet to another terminal, said system comprising:

means for calculating an information progress vector that represents a progress of said message packet;

means for calculating a terminal progress vector that represents a travel performed by a specific terminal among said multiple terminals;

means for calculating a cosine (cos θ) of an angle θ formed by said information progress vector and said terminal progress vector;

means for determining whether said cos θ is equal to or greater than a predetermined value; and means for halting transmission of said message packet from said specific terminal when a decision of said means for determining is false.

9. The information transmission system according to claim 8, further comprising:

means for transmitting said message packet from said specific terminal when the decision of said means for determining is true.

10. The information transmission system according to claim 8, further comprising:

means for calculating said information progress vector by an arbitrary use of two or more kinds of a positional information selected from among:

a positional information for a transmission source terminal included in said information, a positional information for other terminals, excluding said transmission source terminal, where information is relayed, and a positional information obtained by said specific terminal; and means for calculating said terminal progress vector by using current and past positional information obtained by said specific terminal.

11. The information transmission system according to claim 10, further comprising one of:

first means for obtaining positional information for a base station at a terminal that is controlled by said base station, and for using said positional information of said base station as said positional information of said terminal, and second means for using a GPS (Global Positioning System).

12. The information transmission system according to claim 8, wherein said predetermined value is 0.

13. The information transmission system according to claim 8, further comprising:

means for obtaining a density information for a terminal; and means for inhibiting a transmission of said message packet when a relationship s<|x−d| is established for a distance s between said specific terminal and a terminal that transmits information to said specific terminal, a communication limit distance x that is reached by a radio signal sent by said terminal, and an average inter-terminal distance d.

14. The information transmission system according to claim 13, further comprising:

means for requesting a transmission of a positional information by other terminals;

means for receiving said positional information from said other terminals; and means for calculating an inter-terminal distance by using said positional information of said specific terminal and said positional information for said other terminals, and calculating an average of said inter-terminal distances for obtaining said distance d.

15. An information terminal, including means for obtaining a location and means for exchanging message packets by radio, said information terminal comprising:

means for calculating an information progress vector that represents a progress of a message packet;

means for calculating a terminal progress vector that represents a travel performed by a specific terminal among said multiple terminals;

means for calculating a cosine (cos θ) of an angle θ formed by said information progress vector and said terminal progress vector;

means for determining whether said cos θ is equal to or greater than a predetermined value; and means for halting a transmission of said message packet from said specific terminal when a decision of said means for determining is false.

16. The information terminal according to claim 15, further comprising:

means for transmitting said message packet when the decision of said means for determining is true.

17. The information terminal according to claim 15, further comprising:

means for calculating said information progress vector by an arbitrary use of two or more kinds of a positional information selected from among:

a positional information for a transmission source terminal included in said message packet, a positional information for other terminals, excluding said transmission source terminal, where information is relayed, and a positional information obtained by said information terminal; and means for calculating said terminal progress vector by using current and past positional information obtained by said information terminal.

18. The information terminal according to claim 15, wherein said predetermined value is 0.

19. The information terminal according to claim 15, further comprising:

means for requesting a transmission of positional information by other terminals;

means for receiving said positional information from said other terminals;

means for calculating an inter-terminal distance by using said positional information of said information terminal and said positional information for said other terminals, and calculating an average of said inter-terminal distances for obtaining an average inter-terminal distance d; and means for inhibiting a transmission of said information when a relationship s<|x−d| is established for a distance s between said information terminal and a terminal that transmits information to said information terminal, a communication limit distance x that is reached by a radio signal sent by said terminal, and an average inter-terminal distance d.

20. A signal-bearing medium tangibly embodying a program of machine-readable instructions executable by a digital processing apparatus to perform a method of receiving a message packet from a terminal and forwarding said message packet to another terminal, said program of machine-readable instructions comprising:

an information progress vector calculator module for calculating an information progress vector that represents a progress of said message packet;

a terminal progress vector calculator module for calculating a terminal progress vector that represents a travel performed by said information terminal among said multiple terminals;

a cosine calculator for calculating a cosine (cos θ) of an angle θ formed by said information progress vector and said terminal progress vector;

a decision module for determining whether said cos θ is equal to or greater than a predetermined value; and a transmit control module for transmitting said information when a decision output of said decision module is true and for halting transmission of said message packet when the an output of said decision module is false.

21. A message packet distribution method in a radio communication distribution system, said method comprising:

receiving, in a receiving terminal, a message packet having been transmitted from a source terminal;

calculating, in said receiving terminal, an information progress vector representing a direction said received message packet is progressing away from said source terminal;

determining, in said receiving terminal, whether said received message packet should be forwarded, based on said information progress vector; and transmitting said received message packet from said receiving terminal based on said determining.

22. The message packet transmission method of claim 21, further comprising:

calculating, in said receiving terminal, a terminal progress vector representing a motion of said receiving terminal; and using said terminal progress vector as a factor in said determining whether said received message packet should be forwarded.

23. A terminal in a radio communication distribution system, said terminal comprising:

a receiver that receives a message packet having been transmitted from a source terminal;

an information progress vector calculator that calculates an information progress vector representing a direction said received message packet is progressing away from said source terminal;

a decision module that determines whether said received message packet should be forwarded, based on said information progress vector; and a transmitter that transmits said received message packet based on said determining by said decision module.

24. The terminal of claim 23, further comprising:

a terminal progress vector calculator that calculates a terminal progress vector representing a motion of said receiving terminal, wherein said decision module uses said terminal progress vector as a factor in said determining whether said received message packet should be forwarded.

* * * * *